United States Patent
Rupp

(10) Patent No.: US 7,173,899 B1
(45) Date of Patent: Feb. 6, 2007

(54) TRAINING AND SYNCHRONIZATION SEQUENCES FOR WIRELESS SYSTEMS WITH MULTIPLE TRANSMIT AND RECEIVE ANTENNAS USED IN CDMA OR TDMA SYSTEMS

(75) Inventor: Markus Rupp, Nieuwegein (NL)

(73) Assignee: Lucent Technologies Inc., Murray Hill, NJ (US)

( * ) Notice: Subject to any disclaimer, the term of this patent is extended or adjusted under 35 U.S.C. 154(b) by 1069 days.

(21) Appl. No.: 09/648,981

(22) Filed: Aug. 28, 2000

(51) Int. Cl.
*H04J 11/00* (2006.01)
*H04J 3/06* (2006.01)

(52) U.S. Cl. .................. 370/208; 370/514
(58) Field of Classification Search ............ 370/514, 370/515, 208, 209; 375/365, 367
See application file for complete search history.

(56) References Cited

U.S. PATENT DOCUMENTS

| | | | |
|---|---|---|---|
| 4,561,089 A | 12/1985 | Rouse et al. .............. 370/18 |
| 5,081,645 A * | 1/1992 | Resnikoff et al. .......... 375/146 |
| 5,450,456 A * | 9/1995 | Mueller .................... 375/224 |
| 5,712,869 A * | 1/1998 | Lee et al. ................. 375/141 |
| 5,757,767 A | 5/1998 | Zehavi .................... 370/208 |
| 5,793,798 A | 8/1998 | Rudish et al. ............. 375/206 |
| 6,163,564 A * | 12/2000 | Rudish et al. ............. 375/130 |
| 6,366,588 B1 * | 4/2002 | Gans et al. ............... 370/468 |
| 6,389,085 B1 * | 5/2002 | Salt ........................ 375/347 |
| 6,396,953 B1 * | 5/2002 | Abbey ..................... 382/218 |
| 6,434,111 B1 * | 8/2002 | Voyer et al. .............. 370/203 |
| 6,437,837 B1 * | 8/2002 | Seo ......................... 348/735 |
| 6,556,558 B1 * | 4/2003 | Sari ........................ 370/342 |
| 6,567,482 B1 * | 5/2003 | Popovic' .................. 375/343 |
| 6,611,494 B1 * | 8/2003 | Ovalekar et al. .......... 370/208 |
| 6,647,245 B1 * | 11/2003 | Rosenbaum .............. 455/45 |
| 6,788,661 B1 * | 9/2004 | Ylitalo et al. ............. 370/334 |
| 6,873,647 B1 * | 3/2005 | Tiedemann et al. ....... 375/145 |

\* cited by examiner

*Primary Examiner*—Huy D. Vu
*Assistant Examiner*—Blanche Wong
(74) *Attorney, Agent, or Firm*—Eugene J. Rosenthal

(57) ABSTRACT

Orthogonal sequences can be developed and used for use training and synchronizing in CDMA and TDMA systems. In particular, once a sequence is developed that has the length of the product of the channel length and the number of transmit antennas, the sequence is offset by a different amount for each transmit antenna. For example, each sequence could be offset by a multiple of the channel length for each transmit antenna, where the multiple ranges from 0 to N–1, where N is the number of transmit antennas. Furthermore, by not using exactly the same amount of offset shifting for each transmit antenna, e.g., not having each signal offset by the channel length, but keeping the overall total shifting the same, e.g., the average of each shift is the channel length, it is possible to determine at a receiver from which transmit antenna a particular signal originated.

13 Claims, 1 Drawing Sheet

US 7,173,899 B1

TRAINING AND SYNCHRONIZATION SEQUENCES FOR WIRELESS SYSTEMS WITH MULTIPLE TRANSMIT AND RECEIVE ANTENNAS USED IN CDMA OR TDMA SYSTEMS

TECHNICAL FIELD

This invention relates to the art of training and synchronizing of a receiver that receives signals from a channel that introduces noise and intersymbol interference, and in particular, to the training and synchronizing of a receiver of a high data rate code division multiple access (CDMA) system or a high data rate time division multiple access (TDMA) system that uses multiple antennas at the transmitter and multiple antennas at the receiver, so called multiple-input multiple-output (MIMO) systems.

BACKGROUND OF THE INVENTION

The prior art of training and synchronizing a receiver that receives signals via multiple receiver antennas from a channel that introduces noise and intersymbol interference and which were transmitted by multiple antennas at the transmitter yields only a coarse channel estimate, and the training takes longer than is desirable due to an inefficient training sequence.

It has been recognized by the prior art that in orthogonal frequency division multiplexing (OFDM) systems that employ multiple antennas at the transmitter and multiple antennas at the receiver that training and synchronizing could be improved by using an orthogonal training sequence. To this end, a short orthogonal sequence known in the prior art was employed to perform the training and synchronizing. It is possible for OFDM systems to employ a short orthogonal sequence because given the long symbol duration employed in OFDM the channel, when described as a finite impulse response (FIR) filter, appears to have a length of 1, i.e., only a singly FIR filter coefficient is necessary to represent the channel. However, for high data rate CDMA and TDMA systems, which use a much shorter symbol duration, the channel appears considerably longer, e.g., for a 5 MHz bandwidth channel and 4 Msamples transmission rate the channel length is about 80 coefficients. Furthermore, in a MIMO system the required length of the training and synchronizing sequence is the product of the channel length and the number of transmit antennas. Thus, for a channel length of 80 and only 2 transmit antennas the required length of the training and synchronizing sequence is 160. Therefore, the prior art's known short orthogonal sequence cannot be employed for high data rate CDMA and TDMA systems.

SUMMARY OF THE INVENTION

I have recognized that the sequences developed by the process described in concurrently filed application Ser. No. (Case Rupp 14), which is incorporated by reference as if set forth herein in its entirety, can be used to develop training and synchronizing sequences for use in CDMA and TDMA systems. In particular, once a sequence is developed that has the length of the product of the channel length and the number of transmit antennas, the sequence is offset by a different amount for each transmit antenna. For example, each sequence could be offset by a multiple of the channel length for each transmit antenna, where the multiple ranges from 0 to N−1, where N is the number of transmit antennas. Furthermore, by not using exactly the same amount of offset shifting for each transmit antenna, e.g., not having each signal offset by the channel length, but keeping the overall total shifting the same, e.g., the average of all of the shifts is the channel length, it is possible to determine at a receiver from which transmit antenna a particular signal originated.

DETAILED DESCRIPTION

Figure 1:
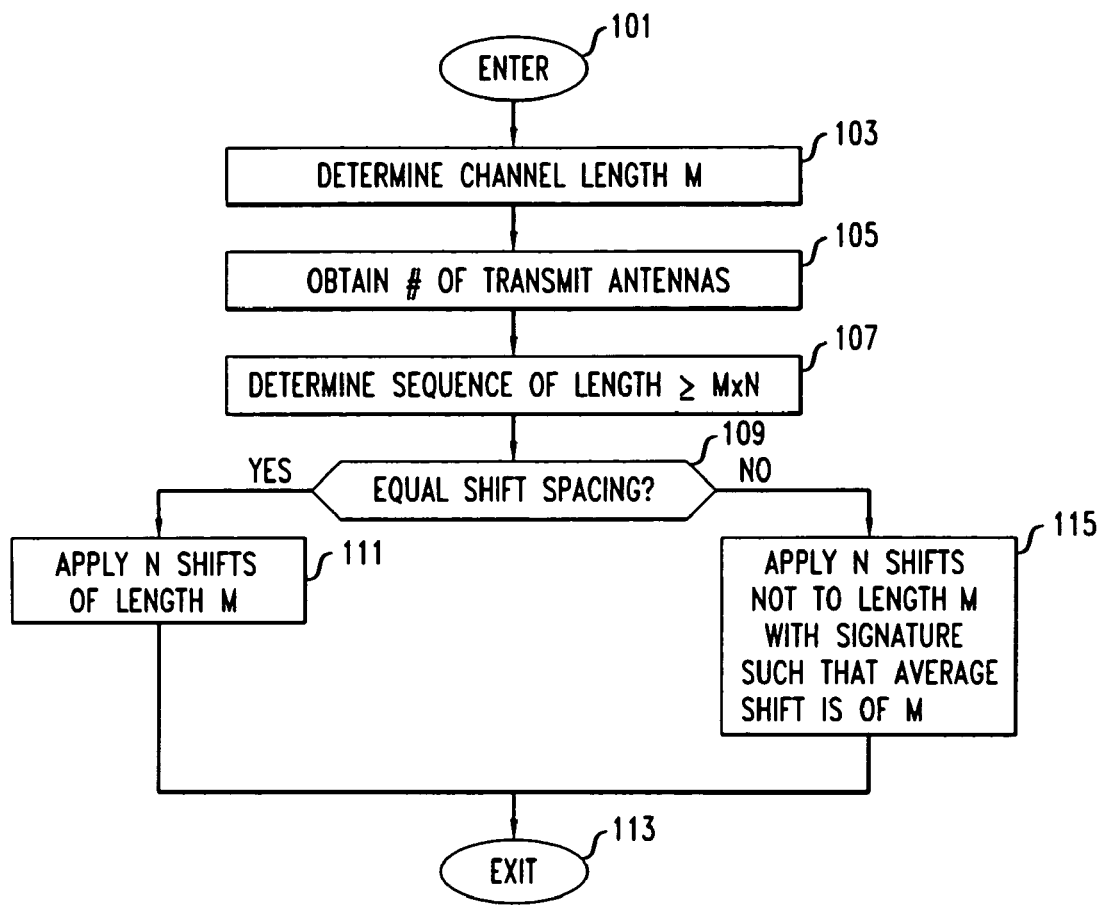
FIG. 1 shows an exemplary process for developing a set of orthogonal sequences for training and/or synchronization for a MIMO system having a long channel length.

The following merely illustrates the principles of the invention. It will thus be appreciated that hose skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

Note that, so called multiple-input multiple-output (MIMO) systems include systems with only one transmitter antenna and multiple receiver antennas, or multiple transmitter antennas with only a single receiver antenna.

FIG. 1 shows, in flowchart form, an exemplary process for developing a set of orthogonal sequences for training and/or synchronization for a MIMO system having a long channel length M when the channel is described as a finite impulse response (FIR) filter. Such long channel lengths are typically found in high data rate CDMA and TDMA systems, e.g., on the order of 1 Mbps and higher.

The process is entered in step 101 when a new orthogonal sequence is required, e.g., when developing a new MIMO wireless communication system. In step 103, the channel length M is determined using conventional techniques known to those of ordinary skill in the wireless communication arts. The number of transmitter antennas, N, that are actively involved in the communication is obtained in step 105. Typically this is simply the number of antennas that have been provisioned at the transmitter for communication use.

Thereafter, in step 107 the product of the channel length M and the number of transmitter antennas, N, that are actively involved in the communication is determined, and an orthogonal sequence of at least that length is determined, e.g., using the method of concurrently filed application Ser. No. (Case Rupp 14).

Next, conditional branch point 109 tests to determine if equal offset spacing, i.e., equal length shifts, is desired for the set of sequences that is to be produced. If the test result in step 109 is YES, indicating equal shift spacing is desired, control passes to step 111, which applies N shifts of length M to the sequence determined in step 107, thereby developing N sequences. Note that this is the same as having each sequence be offset by a multiple of the channel length for each transmit antenna, where the multiple ranges from 0 N−1. The process then exits in step 113.

If the test result in step 109 is NO, control passes to step 115, in which N shifts are applied to the orthogonal sequence obtained in step 107, but the shifts are not uniformly made. Thus, there will be N shifts, but only the average of the shifts need be M. Preferably, in order to distinguish the antennas from which the various signals originate, there should be no symmetry to the pattern of the shifts. The sequence of shifts could be stored in a ROM or other non-volatile memory. Alternatively, they may be derived given a particular rationale, e.g., to make it easier to detect which antenna a signal originates from. The process then exits in step 113.

Figure 2:
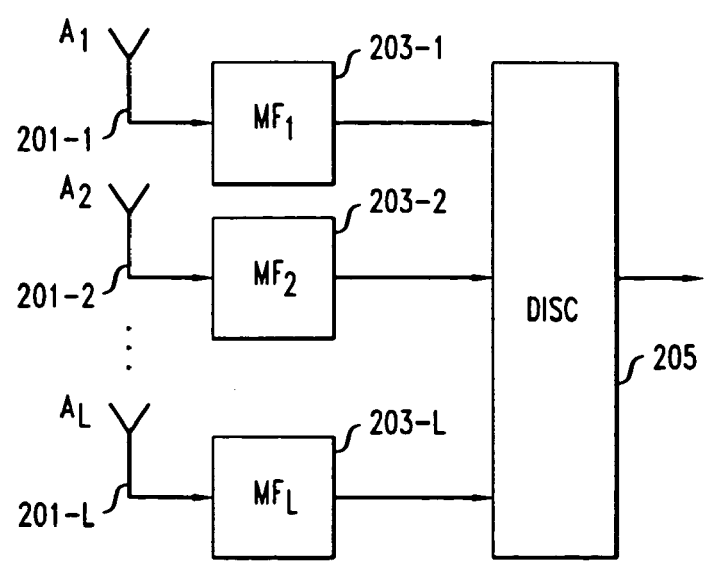
FIG. 2 shows an exemplary receiver for use in a MIMO system which can be used to determine from which transmitter antenna an orthogonal sequence was transmitted, in accordance with an aspect of the invention.

FIG. 2 shows exemplary receiver 200 for use in a MIMO system which can be used to determine from which transmitter antenna an orthogonal sequence was transmitted, in accordance with an aspect of the invention. Receiver 200 includes a) receiver antennas 201, including receiver antennas 201-1 through 201-L; b) matched filters 203, including matched filters 203-1 through 203-L; and c) discriminator 205.

Receiver antennas 201 receive the signals that were transmitted by the transmitter antenna including, at the appropriate time, the orthogonal sequences used for training and/or synchronizing. Although not explicitly shown, for clarity purposes, it is assumed that between antennas 201 and matched filters 203 there are the necessary circuitry to convert the received radio signal into a digital baseband signal. Alternatively, it may be assumed that antennas 201 simply represent the digital baseband signal that was derived from the antenna and it is that signal that is supplied to matched filters 203. The coefficients of each of matched filters 203 are set to the values of the orthogonal sequence, e.g., as developed in step 107 (FIG. 1). Each of matched filters 203 (FIG. 2) performs a convolution between the digital baseband signal it receives and the coefficients which are stored in it. A maximum appears as the output of each of matched filters 203 each time the received signal aligns with the stored coefficients. Discriminator 205 receives the signals supplied as output by each of matched filters 203 and based upon the peaks received supplies an output which indicates the time at which a signal from prescribed one of the transmit antennas is being received. To this end, discriminator 205 has stored within it the shift pattern that was used in developing the transmit signals, e.g., the pattern developed in step 115 of FIG. 1. Note that, as described above, discriminator 205 can only determine the time at which a signal from prescribed one of the transmit antennas is being received so long as the offsets employed in developing the transmitted orthogonal sequence has no symmetry to the pattern of the shifts.

What is claimed is:

1. A method for developing an orthogonal sequence for each transmit antenna of a multiple-input multiple-output (MIMO) system having a long channel length, the method comprising the step of:

developing a new orthogonal sequence as a function of first and second existing orthogonal training sequences, said new orthogonal sequence having a length at least as long as the product of the number of transmitter antennas of said MIMO system to be actively involved in transmission of said signal and the channel length for said MIMO system; and producing at least one shifted version of said new orthogonal sequence for each of the transmitter antennas of said MIMO system to be actively involved in transmission of said signal, wherein each of said shifted versions produced is shifted by a prescribed amount.

2. The invention as defined in claim 1 wherein said shifted versions are shifted a multiple of the channel length, said multiple ranging from 0 N−1, where N is the number of transmitter antennas in said MIMO system to be actively involved in transmission of said signal.

3. The invention as defined in claim 1 wherein said shifted versions are shifted from each adjacent version by different amounts so that the spacing between no two shifted versions for adjacent antennas is the same.

4. The invention as defined in claim 1 wherein said shifted versions are shifted from each adjacent version by different amounts so that the shift between no two shifted versions for adjacent antennas is the same, the average of said shifts between each pair of adjacent versions being the channel length.

5. The invention as defined in claim 1 wherein said MIMO system is a system of the set of systems consisting of a high data rate code division multiple access (CDMA) system and a high data rate time division multiple access (TDMA) system.

6. A receiver of a multiple-input multiple-output (MIMO) system having a long channel length, said receiver comprising:

a plurality of receiver antennas receiving signals transmitted via a channel from a plurality of transmitter antennas, each of said transmitter antennas transmitting one of a plurality of new orthogonal sequences which are developed as offset versions of a new orthogonal sequence that is a function of first and second existing orthogonal sequences;

a plurality of matched filters each receiving a respective digital baseband version of a respective signal received by one of said receiver antennas, each of said matched filters having respective coefficient sets so as to yield a maximum output when a particular one of said new orthogonal sequences is supplied to it; and a discriminator, responsive to said outputs of said matched filters, which yields an indicator of a time at which a signal from a prescribed one of said transmitter antennas is being received.

7. The invention as defined in claim 6 wherein said new orthogonal sequences are produced by shifting said new orthogonal sequence a multiple of the channel length of said MIMO system, said multiple ranging from 0 to N−1, where N is the number of transmitter antennas in said MIMO system.

8. The invention as defined in claim 6 wherein each offset between adjacent ones of said offset versions is unique.

9. The invention as defined in claim 6 said MIMO system is a system of the set of systems consisting of a high data rate code division multiple access (CDMA) system and a high data rate time division multiple access (TDMA) system.

10. The invention as defined in 6 wherein said receiver is adapted to detect from which transmit antenna a signal is transmitted as a function of the offset between each of said plurality of new orthogonal sequences.

11. The invention as defined in 6 wherein said offset versions are offset from each adjacent offset version by different amounts, the average of said offsets being the channel length.

12. A method for developing a signal containing an orthogonal sequence for each transmit antenna to be actively involved in transmission of said signal by a multiple-input multiple-output (MIMO) system having a long channel length, the method Characterized by the steps of:

developing a new orthogonal sequence as a function of first and second existing orthogonal training sequences, said new orthogonal sequence having a length at least as long as the product of the number of transmitter antennas of said MIMO system to be actively involved in transmission of said signal and the channel length for said MIMO system;

producing at least one shifted version of said new orthogonal sequence for each of the transmitter antennas of said MIMO system to be actively involved in transmission of said signal, wherein each of said shifted versions produced is shifted by a prescribed amount; and converting into radio form the information of at least one of said shifted versions of said new orthogonal sequence by each of the transmitter antennas of said MIMO system actively involved in transmission of said signal.

13. A receiver of a multiple-input multiple-output (MIMO) system having a long channel length, said receiver being operable to receive and extract information in a radio signal, said signal being Characterized in that said information represents a plurality of new orthogonal sequences which are developed as offset versions of a new orthogonal sequence that is a function of first and second existing orthogonal sequences and has a length equal to the product of the channel length and a number of transmitter antennas actively involved in transmission of said radio signal wherein said receiver further comprises:

a plurality of receiver antennas receiving signals transmitted via a channel from a plurality of transmitter antennas;

a plurality of matched filters each receiving a respective digital baseband version of a respective signal received by one of said receiver antennas, each of said matched filters having respective coefficient sets so as to yield a maximum output when a particular one of said new orthogonal sequences is supplied to it; and a discriminator, responsive to said outputs of said matched filters, which yields an indication of a time at which a signal from a prescribed one of said transmitter antennas is being received.

* * * * *